US010356771B2

United States Patent
Lim et al.

(10) Patent No.: US 10,356,771 B2
(45) Date of Patent: Jul. 16, 2019

(54) METHOD AND DEVICE FOR TRANSMITTING DOWNLINK INFORMATION IN WIRELESS COMMUNICATION SYSTEM

(71) Applicant: Samsung Electronics Co., Ltd., Suwon-si, Gyeonggi-do (KR)

(72) Inventors: Chi-Woo Lim, Suwon-si (KR); Woo-Myoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/329,119

(22) PCT Filed: Apr. 4, 2016

(86) PCT No.: PCT/KR2016/003456
§ 371 (c)(1),
(2) Date: Jan. 25, 2017

(87) PCT Pub. No.: WO2016/159736
PCT Pub. Date: Oct. 6, 2016

(65) Prior Publication Data
US 2017/0230942 A1    Aug. 10, 2017

Related U.S. Application Data

(60) Provisional application No. 62/142,245, filed on Apr. 2, 2015.

(51) Int. Cl.
*H04W 72/04*    (2009.01)
*H04L 5/02*    (2006.01)
(Continued)

(52) U.S. Cl.
CPC ........... *H04W 72/042* (2013.01); *H04L 5/003* (2013.01); *H04L 5/0053* (2013.01); *H04L 5/02* (2013.01);
(Continued)

(58) Field of Classification Search
CPC . H04W 72/042; H04W 28/04; H04W 28/048; H04L 5/003; H04L 5/0053; H04L 5/02; H04L 5/06; H04L 1/0031
(Continued)

(56) References Cited

U.S. PATENT DOCUMENTS

2014/0029562 A1    1/2014  Kishiyama
2014/0044091 A1    2/2014  Kishiyama
(Continued)

FOREIGN PATENT DOCUMENTS

WO    2014-122994 A1    8/2014

OTHER PUBLICATIONS

Justification for NOMA in New Study on Enhanced Multi-User Transmission and Network Assisted Interference Cancellation for LTE, NTT Docomo Inc., RP-141936, 3GPP TSG RAN meeting #66, Dec. 8, 2014, Maui, USA.
(Continued)

*Primary Examiner* — Obaidul Huq
(74) *Attorney, Agent, or Firm* — Jefferson IP Law, LLP

(57) ABSTRACT

A 5th-generation (5G) or pre-5G communication system which is to support a higher data transfer rate beyond a 4G communication system such as a long term evolution (LTE) is provided. The method for transmitting a downlink signal by a base station in a wireless communication system supporting non-orthogonal multiple access (NOMA) includes the steps of selecting a pair of terminals including one short-distance terminal and at least one long-distance terminal which will share an identical downlink transmis-
(Continued)

sion resource, generating a superimposed signal in which a signal for the short-distance terminal and a signal for the long-distance terminal are superimposed on one another, generating information necessary for cancelling the signal of the long-distance terminal from the superimposed signal, transmitting the generated information necessary for cancelling the signal of the long-distance terminal to the short-distance terminal, and transmitting the generated superimposed signal to the pair of terminals.

9 Claims, 8 Drawing Sheets

(51) Int. Cl.
| | | |
|---|---|---|
| *H04L 5/06* | (2006.01) | |
| *H04W 28/04* | (2009.01) | |
| *H04L 5/00* | (2006.01) | |
| *H04L 1/00* | (2006.01) | |

(52) U.S. Cl.
CPC ............... *H04L 5/06* (2013.01); *H04W 28/04* (2013.01); *H04L 1/0031* (2013.01)

(58) Field of Classification Search
USPC .......................................... 370/310, 328, 329
See application file for complete search history.

(56) References Cited

U.S. PATENT DOCUMENTS

| | | | |
|---|---|---|---|
| 2014/0073337 A1 | 3/2014 | Hong et al. | |
| 2015/0312074 A1* | 10/2015 | Zhu | H04L 27/2627 370/329 |
| 2016/0013903 A1* | 1/2016 | Kim | H04J 11/005 370/329 |
| 2016/0029350 A1 | 1/2016 | Kishiyama et al. | |
| 2016/0191174 A1* | 6/2016 | Hwang | H04B 15/00 375/348 |
| 2016/0205695 A1* | 7/2016 | Kishiyama | H04W 72/082 370/315 |
| 2016/0330695 A1* | 11/2016 | Benjebbour | H04W 52/262 |

OTHER PUBLICATIONS

Motivation for Enhanced MU-MIMO and Network Assisted Interference Cancellation, MediaTek Inc., RP-141405, 3GPP TSG RAN Meeting #65, Sep. 9, 2014, Edinburgh, UK.

* cited by examiner

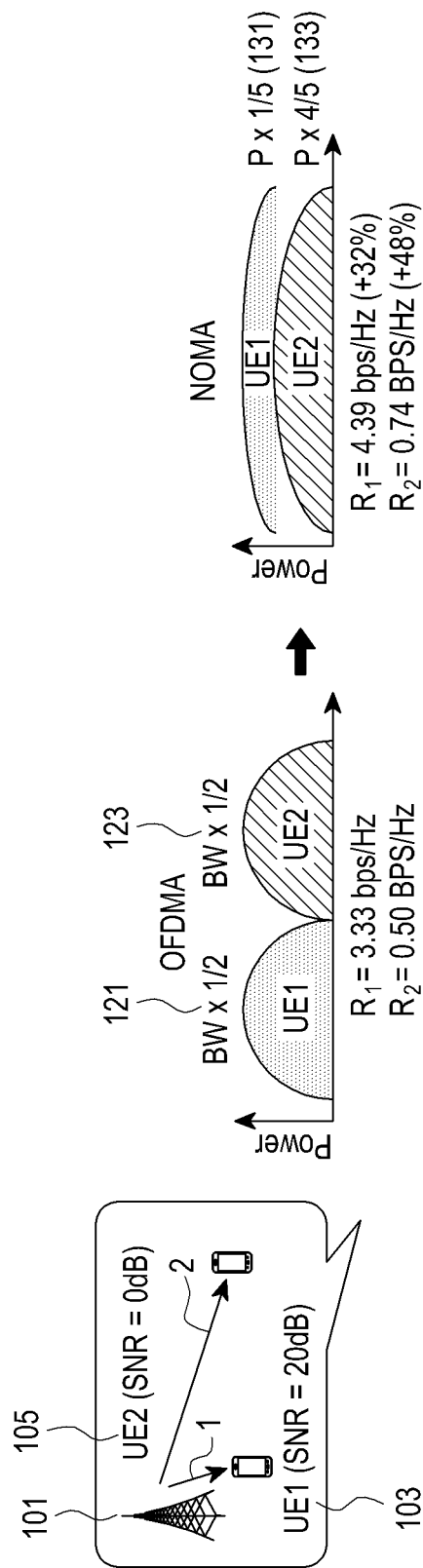

Table 10.5  DCI Formats Used for Downlink Scheduling

| Field | | 1 | 1A | 1B | 1C | 1D | 2 | 2A | 2B | 2C |
|---|---|---|---|---|---|---|---|---|---|---|
| Resource information | Carrier indicator | • | | | | • | • | • | • | • |
| | Resource block assignment | 0/1 | | | | | 0/1 | 0/1 | 0/1 | 0/1 |
| | type | • | 2 | 2 | 2' | 2 | • | • | • | • |
| HARQ process number | | • | • | • | • | • | • | • | • | • |
| First transport block | MCS | • | • | • | | • | • | • | • | • |
| | RV | • | • | • | | • | • | • | • | • |
| | NDI | • | • | • | | • | • | • | • | • |
| Second transport block | MCS | | | | | | • | • | • | • |
| | RV | | | | | | • | • | • | • |
| | NDI | | | | | | • | • | • | • |
| Multi-antenna information | PMI confirmation | | | • | | | | | | |
| | Precoding information | | | • | | • | | | | |
| | Transport block swap flag | | | | | | • | • | | |
| | Power offset | | | | | • | | | | |
| | DM-RS scrambling | | | | | | | | | |
| | # Layers/DM-RS scrambling | | | | | | | | | |
| Downlink assignment index | | • | • | | | • | • | • | • | • |
| PUCCH power control | | • | • | • | | • | • | • | • | • |
| Flag for 0/1A differentiation | | | • | | | | | | | |
| Padding (only if needed) | | (•) | (•) | (•) | | (•) | (•) | (•) | (•) | (•) |
| Identity | | • | • | • | • | • | • | • | • | • |

FIG.2

| Field Name | Length (Bits) | Comment |
|---|---|---|
| Carrier indicator | 0 or 3 | Applicable only when Cross Carrier Scheduling |
| Resource allocation header | 1 | RA Type 0 or RA Type 1 |
| Resource block assignment for RA Type 0 | 17 (10 Mhz) | Applicable only when Resource allocation header = 0 (RA Type 0) |
| Subset | 2 (10 Mhz) | Applicable only when Resource allocation header = 1 (RA Type 1) |
| Shift | 1 (10 Mhz) | Applicable only when Resource allocation header = 1 (RA Type 1) |
| Resource block assignment for RA Type 1 | 14 (10 Mhz) | Applicable only when Resource allocation header = 1 (RA Type 1) |

| Field Name | Length (Bits) | Comment |
|---|---|---|
| TPC for PUCCH | 2 | |
| Downlink Assignment Index | 2 | |
| HARQ Process | 3 (FDD) 4 (TDD) | |
| Transport block to codeword swap flag | 1 | |
| MCS for Transport Block 1 | 5 | |
| NDI for Transport Block 1 | 1 | |
| RV for Transport Block 1 | 2 | |
| MCS for Transport Block 2 | 5 | |
| NDI for Transport Block 2 | 1 | |
| RV for Transport Block 2 | 2 | |
| Precoding information | 3 (2 Antenna) 6 (4 Antenna) | |
| Scrambling identity (Ports-SCID-Number of Layers) | | |
| SRS request(TDD Only) | 1 | |
| MCS for Far UE (for CW-IC) | | Omittable for SL-IC |
| TM for Far UE | | |
| Precoding information for Far UE | | |

FIG.3

METHOD AND DEVICE FOR TRANSMITTING DOWNLINK INFORMATION IN WIRELESS COMMUNICATION SYSTEM

CROSS-REFERENCE TO RELATED APPLICATION(S)

This application is a U.S. National Stage application under 35 U.S.C. § 371 of an International application filed on Apr. 4, 2016 and assigned application number PCT/KR2016/003456, which claimed the benefit of U.S. Provisional application filed on Apr. 2, 2015 in the U.S. Patent and Trademark Office and assigned Ser. No. 62/142,245, the entire disclosure of each of which is hereby incorporated by reference.

TECHNICAL FIELD

The present disclosure relates to a method and apparatus for transmitting downlink (DL) control information in a wireless communication system.

BACKGROUND

To satisfy demands for wireless data traffic having increased since commercialization of $4^{th}$ generation (4G) communication systems, efforts have been made to develop improved $5^{th}$ generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

NOMA is a technique for allowing a plurality of user equipments (UEs) to use identical non-orthogonal time/frequency resources, thereby improving the performance of a system and the fairness of scheduling of the UEs. When compared to NOMA, orthogonal frequency divisional multiple access (OFDMA) used in a general communication system may be referred to as orthogonal multiple access (OMA).

In a NOMA system, an evolved NodeB (eNB) allocates identical time/frequency resources to multiple UEs, and transmits downlink (DL) signals for respective UEs in a superposed manner. Each UE cancels a signal of another UE from its received signal (successive interference cancellation) to restore its signal.

FIGS. 1A, 1B, and 1C illustrates an example to compare communication schemes between an eNB and a UE between a NOMA system and an OMA system according to the related art.

Referring to FIGS. 1A to 1C, it is assumed that when identical time/frequency resources are allocated to two UEs, UE1 103 and UE2 105, an eNB 101 allocates low power (e.g., ⅕ of available power) to a signal 1 for the UE1 103 that is the nearer UE located closer to the eNB 101 than the UE2 105, and allocates high power (e.g., ⅘ of the available power) 133 to a signal 2 for the terminal UE2 105 that is the far UE located farther from the eNB 101 than the UE1 103, and transmits the two signals to the UE1 103 and the UE2 105 in a superposed manner.

When the UE1 103, which is the near UE, receives the superposed signal, attenuation of the signal 1 and the signal 2 may not be large because the UE1 103 is located close to the eNB 101. Herein, since a component of the signal 2 may occupy a large part of the superposed signal received by the UE1 103, a signal-to-noise and interference ratio (SINR) of the superposed signal received by the UE 1 103 is relatively high. Referring to FIGS. 1A to 1C, for example, an SINR is expressed as 20 dB.

On the other hand, if the UE2 105, which is the far UE, receives the superposed signal, the power strength of the signal 1 is low and the UE2 105 is located far from the eNB 101, such that the signal 1 may arrive at the UE2 103 after being mostly attenuated. Thus, the superposed signal received by the UE2 103 may include a component of the signal 1 with power of a level that is similar to noise. As a result, most components of the superposed signal received by the UE2 105 may be occupied by the signal 2. Moreover, the signal 2 may be attenuated while arriving at the UE2 105, such that the magnitude of the SINR of the signal received by the UE2 105 is small. Referring to FIGS. 1A to 1C, for example, an SINR is expressed as 0 dB.

In this example, the superposed signal received by the UE1 103 includes the signal 1 and the signal 2, and the power of the signal 2 is much higher than that of the signal 1, such that the UE1 103 may easily distinguish the signal 1 from the signal 2. Thus, the UE2 cancels the interference of the signal 2 from the superposed signal and receives the signal 1. Meanwhile, in the signal received by the UE2 105, the signal 1 may be processed as noise and only the signal 2 may be processed as a signal component, such that the UE2 105 may receive the signal 2 without a need to perform interference cancellation with respect to the signal 1.

FIG. 1B shows system performance in OMA such as OFDMA. That is, FIG. 1B shows DL transmission performance for the UE1 103 and the UE2 105 when ½ of an available bandwidth 121 and full available power 123 are allocated to the UE1 103 and the UE2 105, respectively. A data rate R1 of the UE1 103 is 3.33 bps/Hz, and a DL data rate R2 of the UE2 105 is 0.50 bps/Hz. Thus, in case of OFDMA, the transmission speed of the entire system is 3.83 bps/Hz.

FIG. 1C shows system performance in a NOMA scheme. When a full available bandwidth is allocated to the UE1 103 and the UE2 105 and ⅕ of available power, 131, and ⅘ of the available power, 133, are allocated to the UE1 103 and the UE2 105, respectively, the DL data rate R1 of the UE1 103 is 4.39 bps/Hz and the DL data rate R2 of the UE2 105 is 0.74 bps/Hz. Thus, in case of NOMA, the transmission speed of the entire system is 5.11 bps/Hz. As such, it can be seen that the entire system performance of NOMA is better than the entire system performance of OFDMA.

In the NOMA system, the overall system performance gain increases as an SINR difference between DL superposed signals received by the UEs that share resources increases. Thus, in the NOMA system, the eNB selects UEs having a large SINR difference between received signals and allocates an identical resource to the UEs. Although it is assumed that two UEs share a resource in FIGS. 1A to 1C, the number of UEs sharing an identical resource may be greater than or equal to 2. However, it is known that a performance gain is not large for three or more UEs even if the number of UEs sharing an identical resource increases.

Meanwhile, the $3^{rd}$ generation partnership project (3GPP) LTE Rel-13 is discussing application for NOMA to the LTE system. However, to support NOMA in LTE, a detailed scheme for transmitting DL information has not yet been determined.

In particular, in the LTE standard specifications, UEs may have different transmission modes (TMs) and different precoding information. If an identical resource is allocated to UEs having different precoding information and/or different TMs, a performance gain increases largely. Therefore, there is a need for a scheme in which UEs having different TMs and/or different precoding information share resources by using NOMA in the LTE communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting downlink (DL) information by an evolved node B (eNB) in a non-orthogonal multiple access (NOMA) system.

Another aspect of the present disclosure is to provide a method and apparatus for providing, by an eNB to a near user equipment (UE), information needed to cancel a signal (hereinafter, referred to as a far UE signal) for a far UE, by using downlink control information (DCI) defined in the long-term evolution (LTE) standard in a NOMA system.

Another aspect of the present disclosure is to provide a method and apparatus for providing, by an eNB to a near UE, information needed to cancel a signal (hereinafter, referred to as a far UE signal) for a far UE, by using a radio resource control (RRC) message defined in the LTE standard in a NOMA system.

In accordance with an aspect of the present disclosure, a method for transmitting a downlink (DL) signal by an evolved NodeB (eNB) in a wireless communication system supporting non-orthogonal multiple access (NOMA) is provided. The method includes selecting a user equipment (UE) pair including at least one near UE and at least one far UE among a plurality of UEs which are to share an identical DL transmission resource, generating a superposed signal by superposing a signal for the at least one near UE and a signal for the far UE, generating information necessary for canceling the signal for the at least one far UE, transmitting the generated information necessary for canceling the signal for the at least one far UE to the at least one near UE, and transmitting the generated superposed signal to the UE pair.

In accordance with another aspect of the present disclosure, a method for receiving a DL signal by a near UE in a wireless communication system supporting NOMA is provided. The method includes receiving, from an eNB, information necessary for canceling a signal for at least one far UE from a superposed signal generated by superposition of a signal for the near UE and a signal for the at least one far UE, receiving the superposed signal, and canceling the signal for the at least one far UE from the superposed signal by using the information necessary for canceling the signal for the at least one far UE.

In accordance with another aspect of the present disclosure, an eNB for transmitting a DL signal in a wireless communication system supporting NOMA is provided. The eNB includes at least one processor (i.e. controller) configured to select a UE pair including at least one near UE and at least one far UE among a plurality of UEs which are to share an identical DL transmission resource and generate a superposed signal by superposing a signal for the at least one near UE and a signal for the at least one far UE, an information generator configured to generate information necessary for canceling the signal for the at least one far UE, and a transceiver configured to transmit the generated information necessary for canceling the signal for the at least one far UE to the at least one near UE and to transmit the generated superposed signal to the UE pair.

In accordance with another aspect of the present disclosure, a UE for receiving a DL signal in a wireless communication system supporting NOMA is provided. The UE includes a transceiver configured to receive, from an eNB, information necessary for canceling a signal for at least one far UE from a superposed signal generated by superposition of a signal for the near UE and a signal for the at least one far, and receive the superposed signal, and an interference canceller configured to cancel the signal for the at least one far UE from the superposed signal by using the information necessary for canceling the signal for the at least one far UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 1A, 1B, and 1C illustrates an example to compare communication schemes between an evolved node B (eNB) and a user equipment (UE) between a non-orthogonal multiple access (NOMA) system and an orthogonal multiple access (OMA) system according to the related art;

FIG. 2 illustrate downlink control information (DCI) formats for scheduling defined in the current long term evolution (LTE) standard according to an embodiment of the present disclosure;

FIG. 3 illustrates an example of a DCI format for a near UE newly defined according to a first embodiment of the present disclosure;

Throughout the drawings, it should be noted that like reference numbers are used to depict the same or similar elements, features, and structures.

DETAILED DESCRIPTION

Figure 4:
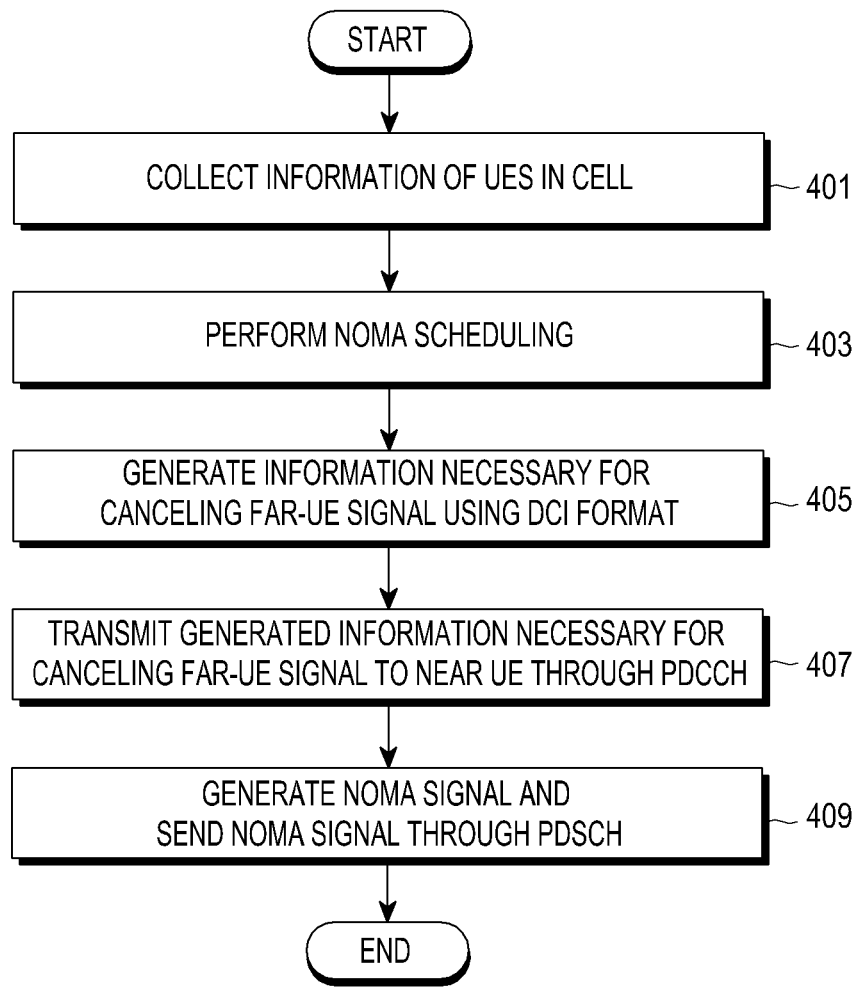
FIG. 4 is a view for describing operations of an eNB according to first and second embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following embodiments will be separately described for convenience, but at least two embodiments may be implemented in combination without colliding with each other.

Further, the terminologies to be described below are defined in consideration of functions in the various embodiments of the present disclosure and may vary depending on a user's or operator's intention or practice. Therefore, the definitions should be made based on the contents throughout the entire description of the present disclosure.

Various changes may be made to various embodiments of the present disclosure and the present disclosure may have various embodiments which will be described in detail with reference to the drawings. However, the various embodiments according to the concept of the present disclosure are not construed as limited to specified disclosures, and include all changes, equivalents, or substitutes that do not depart from the spirit and technical scope of the present disclosure.

Although the terms such as "first" and "second" used in the various embodiments of the present disclosure may modify various elements of the various embodiments, these terms do not limit the corresponding elements. These terms may be used for the purpose of distinguishing one element from another element. For example, a first element may be named as a second element without departing from the right scope of the various embodiments of the present disclosure, and similarly, a second element may be named as a first element. The term "and/or" includes a combination of a plurality of related provided items or any one of the plurality of related provided items.

Herein, the term "include", "have", or the like used in the present disclosure is to indicate the presence of features, numbers, operations, elements, parts, or a combination thereof described in the specifications, and does not preclude the presence or addition of one or more other features, numbers, operations, elements, parts, or a combination thereof.

The apparatus and method proposed in the present disclosure are applicable to various communication systems such as a Long-Term Evolution (LTE) mobile communication system, an LTE-Advanced (LTE-A) mobile communication system, a high speed downlink packet access (HSDPA) mobile communication system, a high speed uplink packet access (HSUPA) mobile communication system, a high rate packet data (HRPD) mobile communication system of the $3^{rd}$ generation partnership project (3GPP) 2, a wideband code division multiple access (WCDMA) mobile communication system of the 3GPP 2, a code division multiple access (CDMA) mobile communication system of the 3GPP 2, the Institute of Electrical and Electronics Engineers (IEEE) 802.16m communication system, an evolved packet system (EPS), a mobile Internet Protocol (IP) system, and so forth.

Before the present disclosure is described in detail, the main concept of the present disclosure will be described in brief.

The present disclosure proposes schemes for transmitting information needed for removing or canceling a far-user equipment (UE) signal included in a non-orthogonal multiple access (NOMA) signal received by a near or short-distance UE to the near UE in a NOMA system. The information needed for canceling the far UE signal may vary with an embodiment, and a detailed description thereof will be described later.

A first scheme proposed in the present disclosure defines a new downlink control information (DCI) format for NOMA and includes information needed for canceling a far UE signal in the NOMA DCI format to support NOMA in an LTE system. The first scheme will be described in first and second embodiments.

A second scheme proposed in the present disclosure includes information needed for canceling a far UE signal in a radio resource control (RRC) message to support NOMA in an LTE system. The second scheme will be described in third through fifth embodiments.

In the first embodiment using the DCI format, the evolved node B (eNB) provides information needed for canceling a far UE signal to the near UE through the newly defined DCI format. In the first embodiment, the information needed for canceling the far UE signal may include modulation and coding scheme (MCS) information of the far UE, transmission mode (TM) information of the far UE, and precoding information of the far UE.

In the second embodiment using the DCI format, the eNB provides an identifier of the far UE (and the TM mode information of the far UE) to the near UE through the newly defined DCI format. The near UE obtains the identifier of the far UE (and the TM mode information of the far UE), receives a DCI (defined in the existing LTE standard) for the far UE by using the identifier of the far UE (and the TM mode information of the far UE), and obtains information needed for canceling the far UE signal, which is additionally required, e.g., MCS information of the far UE, precoding information of the far UE, and so forth, from the DCI for the far UE. For reference, the identifier of the UE may be a cell-radio network temporary identifier (C-RNTI), etc.

In the third embodiment using the RRC message, the eNB provides information needed for canceling a far UE signal to the near UE through an RRC message. The information needed for canceling the far UE signal may include MCS information of the far UE, TM mode information of the far UE, and precoding information of the far UE.

In a fourth embodiment using the RRC message, the eNB provides the identifier of the far UE to the near UE through the RRC message. The near UE having received the identifier of the far UE receives a DCI (defined in the existing LTE standard) for the far UE and additionally obtains needed information, i.e. the MCS information of the far UE, the precoding information of the far UE, etc., from the DCI for the far UE.

In a fifth embodiment using the RRC message, the eNB provides various identifiers of candidate far UEs capable of sharing resources with near UEs to the near UEs through the RRC message in NOMA. The near UE attempts to decode the DCI (defined in the existing LTE standard) for a far or long-distance UE actually scheduled as a NOMA UE pair by using the identifier of each candidate far UE and additionally obtains needed information from the DCI of the actually scheduled far UE if the decoding is successful.

Hereinbelow, various embodiments of the present disclosure will be described.

In the following description, UEs sharing an identical resource in NOMA may be referred to as a NOMA UE pair or a UE pair. The UE pair means not only two UEs, but also three or more UEs.

Generally, in a NOMA system, the eNB's operation of selecting a UE pair by using information of UEs in a cell may be referred to as pairing. For reference, the eNB pairs a UE pair capable of maximizing a NOMA performance gain by using feedback information received from UEs in a cell, e.g., a channel quality indicator (CQI), a precoding matrix indicator (PMI), transmission mode (TM) mode, etc., and allocates an identical resource to the paired UE pair. The eNB transmits information needed for NOMA operations to the paired UE pair.

The far UE perceives a near UE signal as noise as described with reference to FIGS. 1A to 1C, and thus may receive a signal in a typical way for a UE to receive a DL signal in an orthogonal multiple access (OMA) system.

The near UE performs interference cancellation with respect to a far UE signal. More specifically, the near UE demodulates a far UE signal of a received superposed signal at a symbol level or decodes the far UE signal at a codeword level and cancels the demodulated or decoded far UE signal from the received superposed signal. Thereafter, the near UE decodes its (near UE) signal from the received signal from which the far UE signal is cancel. Thus, in the NOMA system, in order for the near UE to demodulate or decode the far UE signal, information needed for canceling the far UE signal is provided to the near UE.

However, as stated above, in the current 3GPP LTE standard, DL signaling for supporting NOMA is not prescribed. According to the current LTE standard, the eNB transmits information needed for decoding data transmitted in a physical downlink shared channel (PDSCH) through a DCI and transmits the needed information to the UE in a physical downlink control channel (PDCCH). In the current LTE standard, a plurality of formats for a DCI are defined. For example, formats 1, 1A, 1B, 1C, 1D, 2, 2A, 2B, 2C, etc., are defined as DCI formats for DL scheduling, and information included in different DCI formats are different and a DCI format to be used may be determined according to a set transmission mode (TM).

FIG. 2 illustrates DCI formats for scheduling defined in the current LTE standard according to an embodiment of the present disclosure.

To add information needed for NOMA operations to the DCI formats, a separate DCI format for the NOMA operations needs to be defined. However, when DCI formats are changed simply by adding the information for the NOMA operations to the formats, the number of DCI formats with respect to which the UE has to perform blind decoding increases, significantly increasing the reception complexity of the UE. Moreover, in the current LTE standard, resources are allocated to the UE through the UE-specific PDCCH signaling, and thus, there is no way to identify information required for the near UE to identify information needed for canceling a far UE signal without changing a DCI format.

The present disclosure newly defines a DCI format for providing information needed for canceling a far UE signal to the near UE for NOMA without changing DCI formats defined in the existing LTE standard. A scheme using a DCI format will be described in the first and second embodiments.

However, various embodiments using a DCI format proposed in the present disclosure (as will be described later) are limited to a case where the number of UE pairs in NOMA is 2 and a fixed resource is used, and thus proposes a scheme for providing information needed for canceling a far UE signal to the near UE by using an RRC message instead of a new DCI format. A scheme using an RRC message will be described in the third through fifth embodiments.

Meanwhile, information needed for supporting NOMA is shown in Table 1.

TABLE 1

| Information | Description |
| --- | --- |
| NOMA Indication | NOMA Indication indicates that corresponding transmission is NOMA transmission. |
| NOMA Power Allocation (PA) Information | PA Information indicates a ratio of a transmission power allocated to a signal of each UE in NOMA transmission. PA Information may be indicated by a power offset value that is a difference than an existing transmission power value. PA Information is information needed not only for far UE as well as for Near UE. However, for a fixed PA value, PA may not be separately provided. In this case, NOMA Indication may substitute for PA Information. |
| Successive Interference Cancellation (SIC) Level | SIC Level indicates the number of signals of far UE for which Near UE is to perform SIC operation with respect to corresponding resource. If the number of UEs sharing resources in NOMA is set to 2, SIC Level is fixed to 1, such that SIC Level may not be separately provided. In this case, NOMA Indication or PA may substitute for SIC Level. In case of non-NOMA in an identical |

TABLE 1-continued

| Information | | Description |
| --- | --- | --- |
| | | resource, SIC Level for each resource has to be indicated. |
| Far UE Information Necessary for SIC Operation of Near UE | Resource Allocation Information of far UE | Indicate allocated resource information to far UE. There is a method for using resource allocation or reducing the size of indication in existing OMA. |
| | MCS Information of far UE (For CW-SIC) | Indicate MCS Information for far UE signals. There is a method for transmitting this information identically to existing Modulation and Coding Scheme (MCS) information or a method for reducing the size of data for MCS indication. |
| | Precoding Information of Far UE | Precoding matrix index (PMI) used for DL transmission for far UE 3 bits or 6 bits according to the number of used antennas |
| | Transmission Mode (TM) of Far UE | TM Information indicates a transmission mode (TM) defined in the LTE standard. The TM information is provided to the UE through RRC Message in the current LTE standard. |

Among the information of Table 1, information needed for the far UE is only PA information. To provide the PA information to the far UE, another DCI format having another size has to be defined. Thus, it is not efficient to define a DCI format only for the far UE for the PA information needed for the far UE. To this end, it is assumed that in NOMA according to the present disclosure, the PA value is fixed. Thus, in Table 1, the PA value does not need to be provided to either the near UE or the far UE.

In Table 1, an SIC level is assumed to be 1. That is, in NOMA, the number of UEs sharing one resource is assumed to be 2. In this case, the SIC level value does not need to be provided to the UE any longer.

As to resource allocation information of the far UE, if a resource allocatable to the far UE is fixed to a preset particular resource, the resource allocation information of the far UE may not need to be provided to the near UE.

In the present disclosure, under the foregoing assumptions, in Table 1, PA information, an SIC level, and resource allocation information of the far UE do not need to be provided to the near UE. Eventually, among the information of Table 1, a NOMA indicator, MCS information of the far UE, precoding information of the far UE, and TM mode information of the far UE are included in information for performing NOMA reception by the near UE. Herein, such information is referred to as information for canceling a far UE signal.

As discussed above, the first embodiment and the second embodiment use newly defined NOMA DCI formats. However, to use the DCI format, a fixed resource needs to be allocated to the far UE and an SIC level value needs to be fixed to 1, such that the first embodiment and the second embodiment are intended for NOMA operations under such restrictions.

The third through fifth embodiments use an RRC message instead of a DCI format. To the various embodiments using the RRC message, the restrictions in the first and second embodiments are not applied. Thus, there is no limitation in the number of NOMA UE pairs, and an allocated resource is not fixed. Each embodiment will be described in detail.

<First Embodiment>

The first embodiment according to the present disclosure newly defines a DCI format for the near UE and provides information needed for canceling a far UE signal to the near UE through the newly defined DCI format. The information needed for canceling the far UE signal may include MCS information of the far UE, TM mode information of the far UE, and precoding information of the far UE. For reference, in the first embodiment, the newly defined DCI format is the NOMA indicator of Table 1.

FIG. 3 illustrates an example of a DCI format for the near UE newly defined in the first embodiment of the present disclosure.

Referring to FIG. 3, in the bottom three lines of FIG. 3, MCS information of the far UE, TM mode information of the far UE, and precoding information of the far UE are indicated.

According to the first embodiment, once the eNB provides the MCS information of the far UE, the TM mode information of the far UE, and the precoding information of the far UE to the near UE through the newly defined DCI format, the near UE may cancel interference of the far UE signal by performing successive interference cancellation (SIC) with respect to the far UE signal by using the foregoing information, thereby successfully receiving a signal transmitted to the near UE.

<Second Embodiment>

The second embodiment of the present disclosure includes an identifier of the far UE and TM mode information of the far UE in a newly defined NOMA DCI format. However, the TM mode information of the far UE is included when a TM mode of the near UE and a TM mode of the far UE are different. The MCS information of the far UE and the precoding information of the far UE, which are included in the DCI format in the first embodiment, are not included in the NOMA DCI format in the second embodiment.

According to the second embodiment, the eNB provides the identifier of the far UE and the TM mode information of the far UE to the near UE through the newly defined DCI format. The near UE receives a DCI (defined in the existing LTE standard) for the far UE by using the identifier of the far UE and the TM mode information of the far UE, and additionally obtains the MCS information of the far UE and the precoding information of the far UE from the DCI for the far UE. Thereafter, the near UE cancels the interference of the far UE signal by performing SIC with respect to the far UE signal using information needed for canceling the far UE signal, which includes the received information and the additionally obtained information, thereby successfully receiving the transmitted signal.

<Third Embodiment>

The third embodiment of the present disclosure includes the information needed for canceling the far UE signal, i.e. the MCS information of the far UE, the TM mode information of the far UE, and the precoding information of the far UE in the RRC message. However, the RRC message has to be transmitted to the UE before the eNB performs NOMA transmission to the UE, such that a time interval (i.e. a predetermined number of subframes) between a point in time when the RRC message is transmitted (i.e. a subframe) and a point in time when the NOMA transmission is performed has to be set in advance or information about the time interval has to be included in the RRC message.

According to the third embodiment of the present disclosure, the eNB transmits the RRC message including the information needed for canceling the far UE signal to the near UE. The UE receives the information through the RRC message, and performs operations for NOMA reception by using the information obtained from the RRC message upon the elapse of a preset time or a predetermined time (i.e. a predetermined subframe) corresponding to time interval information included in the RRC message. More specifically, the near UE performs SIC with respect to the far UE signal included in a NOMA signal received from the eNB through the PDSCH by using the information needed for canceling the far UE signal. In this way, by canceling the interference of the far UE signal, a signal transmitted to the near UE may be successfully received.

<Fourth Embodiment>

The fourth embodiment of the present disclosure includes an identifier of the far UE and TM mode information of the far UE in an RRC message. However, the TM mode information of the far UE is included when a TM mode of the near UE and a TM mode of the far UE are different. In addition, the RRC message has to be transmitted to the UE before the eNB performs NOMA transmission to the UE, such that a time interval (i.e. a predetermined subframe) between a point in time when the RRC message is transmitted (i.e. a subframe) and a point in time when the NOMA transmission is performed (i.e. a subframe) has to be set in advance or has to be included in the RRC message.

According to the fourth embodiment, once the eNB provides the identifier of the far UE and the TM mode information of the far UE to the near UE through the RRC message, the near UE receives a DCI (defined in the existing LTE standard) for the far UE by using the identifier of the far UE and the TM mode information of the far UE after the predetermined subframe, and additionally obtains the MCS information of the far UE and the precoding information of the far UE from the DCI for the far UE. Thereafter, the near UE cancels the interference of the far UE signal by performing SIC with respect to the far UE signal included in the NOMA signal received through the PDSCH using information needed for canceling the far UE signal, thereby successfully receiving the transmitted signal.

<Fifth Embodiment>

In the third embodiment and the fourth embodiment, the eNB has to send an RRC message including information about the far UE to the near UE before performing NOMA transmission. Thus, the eNB needs to perform pairing between the far UE and the near UE for NOMA before sending the RRC message. In this way, once a UE pair is paired in advance for NOMA and a resource is previously scheduled to the UEs, a greater performance loss due to previous scheduling may occur than a performance gain based on NOMA.

Thus, in the fifth embodiment of the present disclosure, not to previously perform pairing and scheduling with respect to UEs for NOMA, an identifier of each of a plurality of candidate far UEs capable of NOMA pairing is provided to the near UE through the RRC message. However, if the TM modes of the candidate far UEs are different from the TM mode of the near UE, the TM mode information of the far UE is also included in the RRC message. In addition, the RRC message has to be transmitted to the UE before the eNB performs NOMA transmission to the UE, such that a time interval (i.e. a predetermined subframe) between a point in time when the RRC message is transmitted (i.e. a subframe) and a point in time when the NOMA transmission is performed (i.e. a subframe) has to be set in advance or has to be included in the RRC message.

That is, according to the fifth embodiment of the present disclosure, the eNB provides identifier information (and TM mode information of the candidate far UEs) to the near UE through the RRC message. The near UE performs decoding with respect to a DCI (defined in the existing LTE standard) for the far UE by using the identifier information (and the TM mode information of the candidate far UEs) after the predetermined subframe. If decoding with respect to the DCI for the far UE is successful, the MCS information of the actual far UE and the precoding information of the actual far UE may be additionally obtained from the DCI. Thereafter, the near UE cancels the interference of the far UE signal by performing SIC with respect to the far UE signal using information needed for canceling the actual far UE signal, thereby successfully receiving the transmitted signal.

Hereinbelow, operations of the eNB according to various embodiments of the present disclosure will be described in detail.

FIG. 4 is a view for describing operations of an eNB according to the first and second embodiments of the present disclosure.

Referring to FIG. 4, in operation 401, the eNB collects channel quality information like CQI, precoding information like PMI, TM mode information, MCS information, and so forth. The information may be received from UEs or may be determined by the eNB.

In operation 403, the eNB determines a NOMA UE pair by using the collected information and performs NOMA scheduling that allocates resources to the determined UE pair. To determine the UE pair, for example, a UE pair having a large CQI difference may be selected. The precoding information, the TM mode information, the MCS information, and so forth may also be considered for the determination. However, as described above, in the first embodiment and the second embodiment, it is assumed that the resource is fixed and 2 UEs are included in the UE pair.

In operation 405, the eNB generates information necessary for canceling a far UE signal for the determined UE pair by using a DCI according to the above-described embodiment. That is, the information necessary for canceling a far UE signal is generated using a DCI format.

In operation 407, the eNB transmits the generated information necessary for canceling the far UE signal to the near UE through a PDCCH. In operation 409, the eNB generates a NOMA signal by superposing signals for the respective UEs of the UE pair and sends the generated NOMA signal through the PDSCH. For reference, in the various embodiments of the present disclosure, it is assumed that transmission power allocation (PA) for the signals for the respective UEs of the UE pair uses a fixed value.

Figure 5:
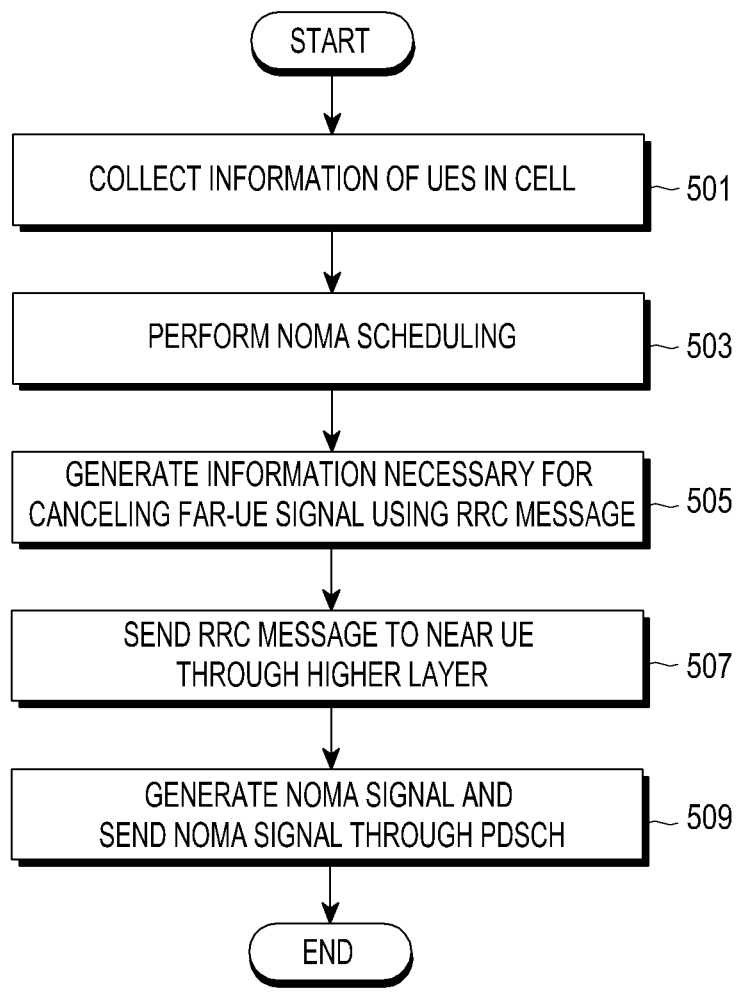
FIG. 5 is a view for describing operations of an eNB according to third through fifth embodiments of the present disclosure.

FIG. 5 is a view for describing operations of an eNB according to third through fifth embodiments of the present disclosure.

Referring to FIG. 5, operation 501 is identical to operation 401 of FIG. 4 and operation 503 is identical to operation 403 of FIG. 4. However, in the third through fifth embodiments, it is assumed that the resource is fixed and the number of UEs included in the UE pair is not limited to two (2).

In operation 505, the eNB generates the information necessary for canceling the far UE signal using the RRC message. The information necessary for canceling the far UE signal may include the MCS information of the far UE, the TM mode information of the far UE, and the precoding information of the far UE in the third embodiment, includes the identifier of the far UE and the TM mode information of the far UE in the fourth embodiment, and includes an identifier of each candidate far UE in the fifth embodiment.

In operation 507, the eNB sends the generated RRC message to the near UE through a higher layer.

In operation 509, the eNB generates a NOMA signal by superposing signals for the respective UEs of the UE pair and sends the generated NOMA signal through the PDSCH.

For reference, in the various embodiments of the present disclosure, it is assumed that transmission PA for the signals for the respective UEs of the UE pair uses a fixed value. Meanwhile, the NOMA signal is sent in a subframe upon the elapse of a preset time or a predetermined time (i.e. a predetermined subframe) corresponding to time interval information included in the RRC message.

Figure 6:
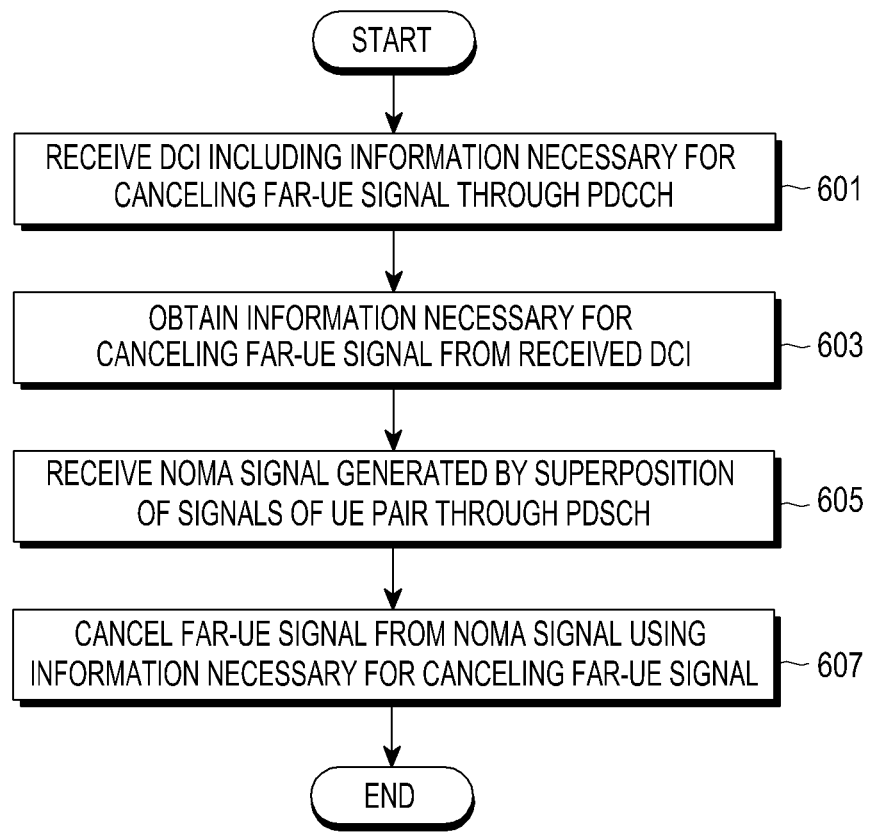
FIG. 6 is a view for describing operations of a near UE according to the first and second embodiments of the present disclosure.

FIG. 6 is a view for describing operations of a near UE according to the first and second embodiments of the present disclosure.

Referring to FIG. 6, in operation 601, the near UE receives its DCI including information necessary for canceling interference of a far UE signal through the PDCCH.

In operation 603, the near UE obtains the information necessary for canceling the interference of the far UE signal from the received DCI. The information necessary for canceling the far UE signal may include the MCS information of the far UE, the TM mode information of the far UE, and the precoding information of the far UE in the first embodiment, and includes the identifier of the far UE and the TM mode information of the far UE in the second embodiment.

In operation 605, the near UE receives a NOMA signal generated by superposition of signals of a UE pair through the PDSCH.

In operation 607, the near UE cancels the far UE signal from the NOMA signal by using the information necessary for canceling the interference of the far UE signal. More specifically, the near UE demodulates a far UE signal of a received superposed signal at a symbol level or decodes the far UE signal at a codeword level and cancels the demodulated or decoded far UE signal from the received superposed signal.

Figure 7:
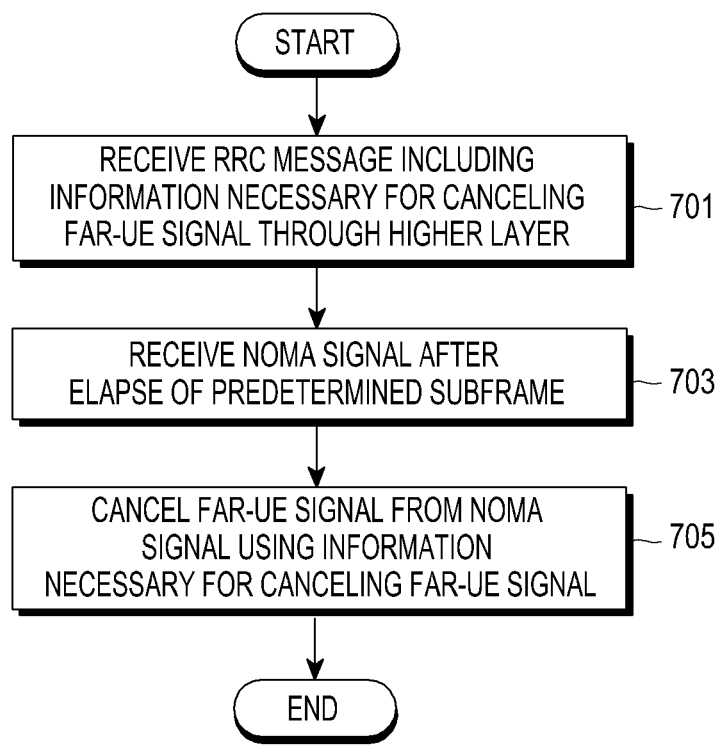
FIG. 7 is a view for describing operations of a near UE according to the three through fifth embodiments of the present disclosure.

FIG. 7 is a view for describing operations of a near UE according to the three through fifth embodiments of the present disclosure.

Referring to FIG. 7, in operation 701, the near UE receives an RRC message including information necessary for canceling interference of the far UE signal through a higher layer. The information necessary for canceling the far UE signal may include the MCS information of the far UE, the TM mode information of the far UE, and the precoding information of the far UE in the third embodiment, includes the identifier of the far UE and the TM mode information of the far UE in the fourth embodiment, and includes an identifier of each candidate far UE in the fifth embodiment.

In operation 703, the near UE receives the NOMA signal generated by superposition of signals of the UE pair from the eNB upon the elapse of a preset time or a predetermined time (i.e. a predetermined subframe) corresponding to time interval information included in the RRC message.

In operation 705, the near UE cancels interference of the far UE signal at a symbol level or a codeword level by performing SIC with respect to the far UE signal in the received NOMA signal using the information necessary for canceling the far UE signal, which is obtained from the RRC message.

Figure 8:
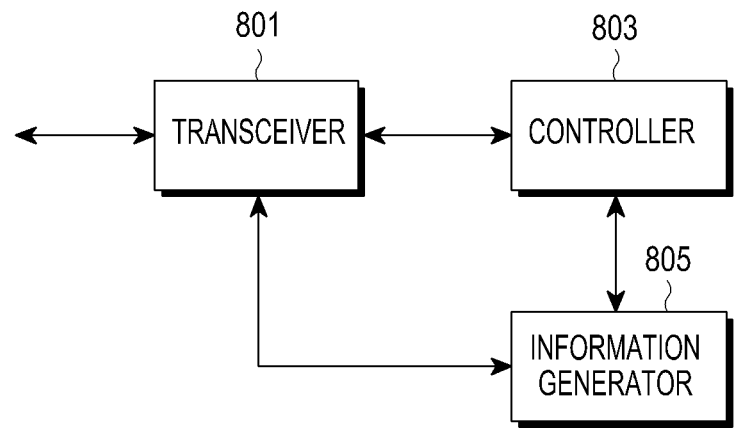
FIG. 8 is a block diagram of an eNB that performs operations according to various embodiments of the present disclosure.

FIG. 8 is a block diagram of an eNB that performs operations according to various embodiments of the present disclosure.

Referring to FIG. 8, the eNB may include a transceiver 801, a controller 803 (i.e. at least one processor), and an information generator 805.

The transceiver 801 receives channel quality information like CQI, precoding information like PMI, TM mode information, MCS information, and so forth. The information may be received from UEs or may be determined by the eNB.

The controller 803 determines a NOMA UE pair by using the collected information, performs NOMA scheduling that allocates resources to the determined UE pair, and controls overall operations corresponding to the description of the foregoing embodiments. For example, the controller 803 may generate a NOMA signal by superposing signals for respective UEs of the UE pair and send the NOMA signal to the UE pair through the transceiver 801.

The information generator 805 generates information necessary for canceling a far UE signal for the determined UE pair by using a DCI according to the above-described embodiment. The generated DCI or RRC message is sent to the near UE through the transceiver 801.

The description made with reference to FIG. 8 regards only to main operations of the various embodiments of the present disclosure for convenience, and even operations not described with reference to FIG. 8 may be included in the operations of the near UE described in the various embodiments of the present disclosure.

Figure 9:
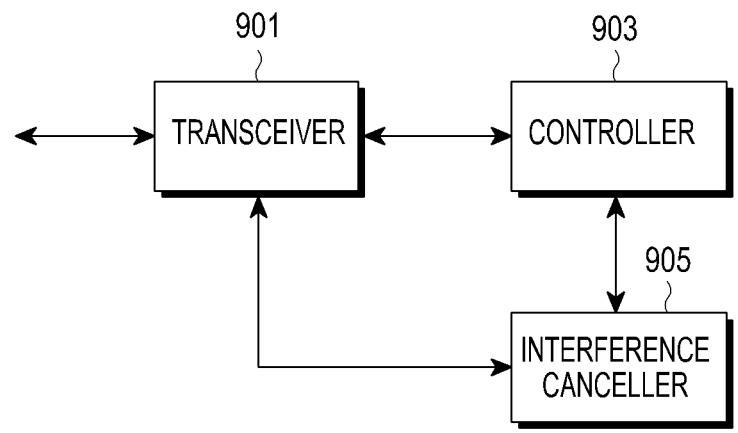
FIG. 9 is a block diagram of an UE that performs operations according to various embodiments of the present disclosure.

FIG. 9 is a block diagram of an UE that performs operations according to various embodiments of the present disclosure.

Referring to FIG. 9, the UE may include a transceiver 901, a controller 903 (i.e. at least one processor), and an interference canceller 905.

The transceiver 901 receives its DCI through the PDCCH or receives an RRC message through a higher layer. The DCI or the RRC message may include information necessary for canceling interference of the far UE signal. The transceiver 901 receives a NOMA signal generated by superposition of signals of a UE pair through the PDSCH.

The controller 903 detects the information necessary for canceling the interference of the far UE signal from the DCI or the RRC message and controls overall operations of the UE according to the various embodiments of the present disclosure.

The interference canceller 905 cancels the far UE signal from the NOMA signal by using the information necessary for canceling the interference of the far UE signal.

The description made with reference to FIG. 9 regards only to main operations of the various embodiments of the present disclosure for convenience, and even operations not described with reference to FIG. 9 may be included in the operations of the near UE described in the various embodiments of the present disclosure.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disc ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a ROM, etc.), a memory (e.g., a RAM, a memory chip, a memory device, or a memory IC), or a machine (e.g., computer) recordable optical or magnetic storage medium (e.g., a CD, a digital versatile disc (DVD), a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting a downlink (DL) signal by a base station in a wireless communication system supporting non-orthogonal multiple access (NOMA), the method comprising:
   selecting a user equipment (UE) pair comprising a near UE and a far UE among a plurality of UEs which are to share an identical DL transmission resource;
   generating a superposed signal by superposing a first signal for the near UE and a second signal for the far UE;
   generating information for canceling the second signal from the superposed signal;
   transmitting, to the near UE, downlink control information (DCI) comprising the information for canceling the second signal; and
   transmitting, to the UE pair, the superposed signal
   wherein the information for canceling the second signal comprises modulation and coding scheme (MCS) information of the far UE, transmission mode (TM) information of the far UE, and precoding information of the far UE.

2. The method of claim 1, wherein the information for canceling the second signal further comprises an identifier of the far UE.

3. The method of claim 1, wherein, if the information for canceling the second signal is generated using a radio resource control (RRC) message, the information for canceling the second signal further comprises an identifier of each at least one candidate UE of the far UE capable of sharing the identical DL transmission resource and the TM information.

4. A method for receiving a downlink (DL) signal by a near user equipment (UE) in a wireless communication system supporting non-orthogonal multiple access (NOMA), the method comprising:
   receiving, from a base station, downlink control information (DCI) comprising information for canceling an interference which is a first signal for a far UE;
   receiving, from the base station, a superposed signal which is generated by superposition of the first signal for the far UE and a second signal for a near UE; and
   canceling the interference from the superposed signal by using the information for canceling the interference,
   wherein the information for canceling the interference comprises modulation and coding scheme (MCS) information of the far UE, transmission mode (TM) information of the far UE, and precoding information of the far UE.

5. The method of claim 4, wherein the information for canceling the interference comprises an identifier of the far UE.

6. The method of claim 4, wherein, if the information for canceling the interference is generated using a radio resource control (RRC) message, the information for canceling the interference further comprises an identifier of at least one candidate UE of the far UE capable of sharing an identical DL transmission resource and the TM information.

7. A base station for transmitting a downlink (DL) signal in a wireless communication system supporting non-orthogonal multiple access (NOMA), the base station comprising:
   at least one processor configured to:
      select a user equipment (UE) pair comprising a near UE and a far UE among a plurality of UEs which are to share an identical DL transmission resource,
      generate a superposed signal by superposing a first signal for the near UE and a second signal for the far UE, and
      generate information for canceling the second signal from the superposed signal; and
   a transceiver configured to:
      transmit, to the near UE, downlink control information (DCI) comprising the information for canceling the second signal, and
      transmit, to the UE pair, the superposed signal,
   wherein the information for canceling the second signal comprises modulation and coding scheme (MCS) information of the far UE, transmission mode (TM) information of the far UE, and precoding information of the far UE.

8. The base station of claim 7, wherein, if the information for canceling the interference is generated using a radio resource control (RRC) message, the information for canceling the interference further comprises an identifier of at least one candidate UE of the far UE capable of sharing the identical DL transmission resource and the TM information.

9. A near user equipment (UE) for receiving a downlink (DL) signal in a wireless communication system supporting non-orthogonal multiple access (NOMA), the UE comprising:

a transceiver configured to:
- receive, from a base station, downlink control information (DCI) comprising information for canceling an interference which is a first signal for a far UE, and
- receive, from the base station, a superposed signal which is generated by superposition of the first signal for the far UE and a second signal for a near UE; and an interference canceller configured to cancel the interference from the superposed signal by using the information for canceling the interference, wherein the information for canceling the interference comprises modulation and coding scheme (MCS) information of the far UE, transmission mode (TM) information of the far UE, and precoding information of the far UE.

* * * * *